United States Patent
Derderian et al.

(10) Patent No.: US 9,118,973 B1
(45) Date of Patent: Aug. 25, 2015

(54) AIRCRAFT DIGITAL MEDIA ENTERTAINMENT SYSTEMS, DEVICE, AND METHOD EMPLOYED THEREIN

(71) Applicants: Ara J. Derderian, Trabuco Canyon, CA (US); Bhupesh Patel, Pomona, CA (US); Michael J. Tiffany, Laguna Beach, CA (US); Chris A. Jameson, Fullerton, CA (US)

(72) Inventors: Ara J. Derderian, Trabuco Canyon, CA (US); Bhupesh Patel, Pomona, CA (US); Michael J. Tiffany, Laguna Beach, CA (US); Chris A. Jameson, Fullerton, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 529 days.

(21) Appl. No.: 13/626,076

(22) Filed: Sep. 25, 2012

(51) Int. Cl.
```
G06F 3/048      (2013.01)
H04N 21/61      (2011.01)
H04N 7/173      (2011.01)
G06F 1/26       (2006.01)
```

(52) U.S. Cl.
CPC ....... *H04N 21/6143* (2013.01); *H04N 7/17318* (2013.01); *G06F 1/263* (2013.01)

(58) Field of Classification Search
CPC ....... G06F 13/4022; G06F 1/26; G06F 1/263; H04B 7/18508; H04B 7/18504; H04B 21/6143; H04B 7/17318

USPC .......................... 715/716, 731, 735–745, 864
See application file for complete search history.

(56) References Cited

U.S. PATENT DOCUMENTS

| | | | |
|---|---|---|---|
| 2011/0246891 A1* | 10/2011 | Schubert et al. | 715/719 |
| 2012/0238204 A1* | 9/2012 | Lynch et al. | 455/13.1 |

* cited by examiner

*Primary Examiner* — Tuyetlien Tran
*Assistant Examiner* — Truc Chuong
(74) *Attorney, Agent, or Firm* — Angel N. Gerdzhikov; Donna P. Suchy; Daniel M. Barabieri

(57) ABSTRACT

A novel and non-trivial aircraft digital media entertainment system, device, and method employed therein are disclosed. A content controller is configured to receive first data initiated through a media player application installed in a first portable device configured with a mobile operating system; retrieve and stream second data responsive to the first data to the first portable device; receive third data initiated through a remote control application installed in a second portable device configured with the mobile operating system; retrieve and stream fourth data responsive to the third data to a channel processor for subsequent distribution to one or more displays; receive fifth data initiated through a cabin channel control application installed in a cabin channel controller configured with an aircraft system operating system; and retrieve and stream sixth data responsive to the fifth data to a channel processor for subsequent distribution to one or more displays.

12 Claims, 7 Drawing Sheets

AIRCRAFT DIGITAL MEDIA ENTERTAINMENT SYSTEMS, DEVICE, AND METHOD EMPLOYED THEREIN

BACKGROUND OF THE INVENTION

1. Field of the Invention

This invention pertains to the field of aircraft cabin entertainment systems and/or networks.

2. Description of the Related Art

Aircraft employ cabin entertainment systems from which passengers of the aircraft may enjoy in-flight entertainment provided on a commonly viewed screen found on a bulkhead or ceiling or an individually viewed screen found, for instance, or in the armrest of a passenger seat. Many cabin entertainment systems employ computer operating systems that are proprietary in nature; that is, they may have been developed by an entertainment system vendor and/or owner or operator of the aircraft.

Although these types of cabin entertainment systems have proven useful and have enjoyed a long history of utilization, the opportunity to employ new media technologies is now available. With the increased usage of portable electronic devices (singularly, "PED") such as tablet devices and smartphones, passengers of aircraft (e.g., business jets) may view the content stored in each of these; however, the content from which the passenger may be entertained may be limited to the content stored in his or her PED, and he or she may not have access to the content stored in a content library maintained on board by the owner or operator of the aircraft. Moreover, the operating system employed by the cabin entertainment system may not be compatible with a mobile operating system employed by the personal device(s).

BRIEF SUMMARY OF THE INVENTION

The embodiments disclosed herein present at least one novel and non-trivial aircraft digital media entertainment system, a device found therein, and a method employed by the device. With the embodiments disclosed herein, cabin entertainment systems employing a non-mobile operating system may be improved upon by adding user accessibility of digital media content developed for mobile operating systems to the occupant of the aircraft who possesses a portable electronic device (e.g., an iOS device) and providing him or her with the ability to control and direct the digital media content to one or more displays found in the cabin of an aircraft.

In one embodiment, an aircraft digital media entertainment system is disclosed for presenting video and/or audio of digital media content on one or more displays. The system may be comprised of one or more PEDs configured with at least a sharing protocol and a media application developed for a mobile operating system; one or more PEDs configured with at least the sharing protocol and a remote control application developed for the mobile operating system; one or more cabin channel controllers configured with a cabin channel control application developed for an existing cabin operating system; one or more channel processors configured to control the digital media content streamed through each channel; a communications interface to facilitate exchanges and streaming of data; a content controller configured with the sharing protocol and configured to receive requests for digital media contents and retrieve and stream the digital media content responsive to the requests; and a content library in which digital media is stored and from which such content is retrieved.

In another embodiment, a device is disclosed for controlling the access to digital media content requested from the one or more users of PEDs and a cabin channel controller of an existing cabin entertainment system. Once accessed, the digital media content may be streamed to a PED or a display of the existing cabin entertainment system.

In another embodiment, a method employed in an aircraft digital media entertainment system is disclosed. When properly configured, the content controller may receive a request for data originally sent from a first PED configured with a media player application through which a user directly manipulates at least one interface control element of the media player application; may retrieve and stream content to the first PED in response to the request; may receive a request for data originally sent from a second PED configured with a remote control application through which a user directly manipulates at least one interface control element of the remote control application; may retrieve and stream content to a channel processor in response to the request; may receive a request for data initiated from an existing cabin channel controller and sent from one channel processor configured with the remote control application through which a user indirectly manipulates at least one interface control element of the remote control application; and may retrieve and stream content to the channel processor in response to the request. As embodied herein, the indirect manipulation of each interface control element of the remote control application could correspond to the direct manipulation of one interface control element of a cabin channel control application employed by the existing cabin channel controller.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

FIGS. 1A through 1D depict block diagrams of an entertainment system or network ("entertainment network") 100 suitable for implementation of the techniques described herein. The entertainment network 100 of the embodiments of FIGS. 1A and 1B includes a processing unit 110, a wireless access point ("WAP") 120, a first portable electronic device ("PED") 130, a second PED 140, and a cabin entertainment system 150; for the embodiments of FIGS. 1C and 1D, the entertainment network includes a processing unit 110, a WAP 120, a first portable electronic device ("PED") 130, a second PED 140, and a display 156.

Figure 1A:
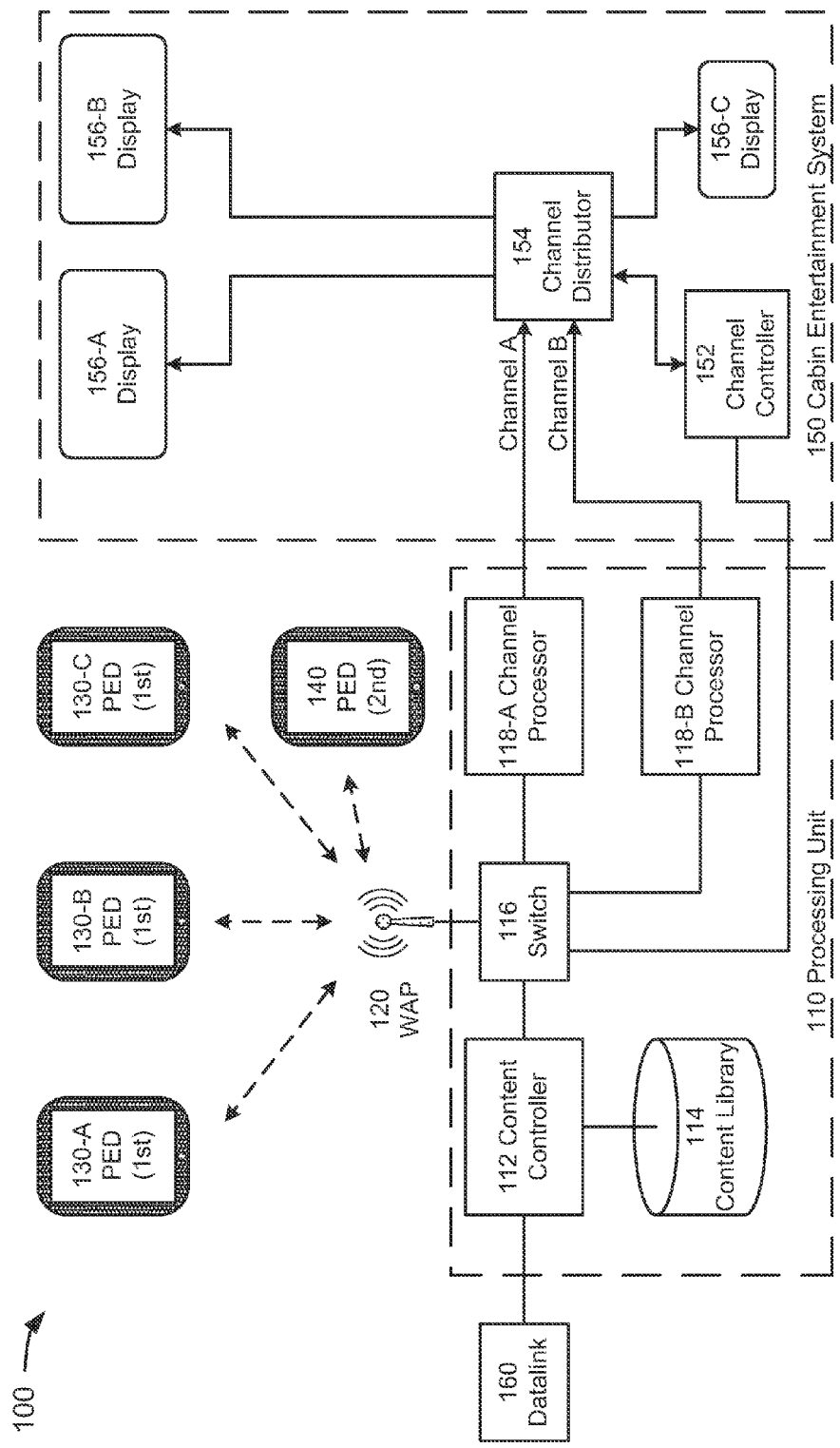
FIG. 1A depicts a block diagram of an entertainment system or network.
Figure 1B:
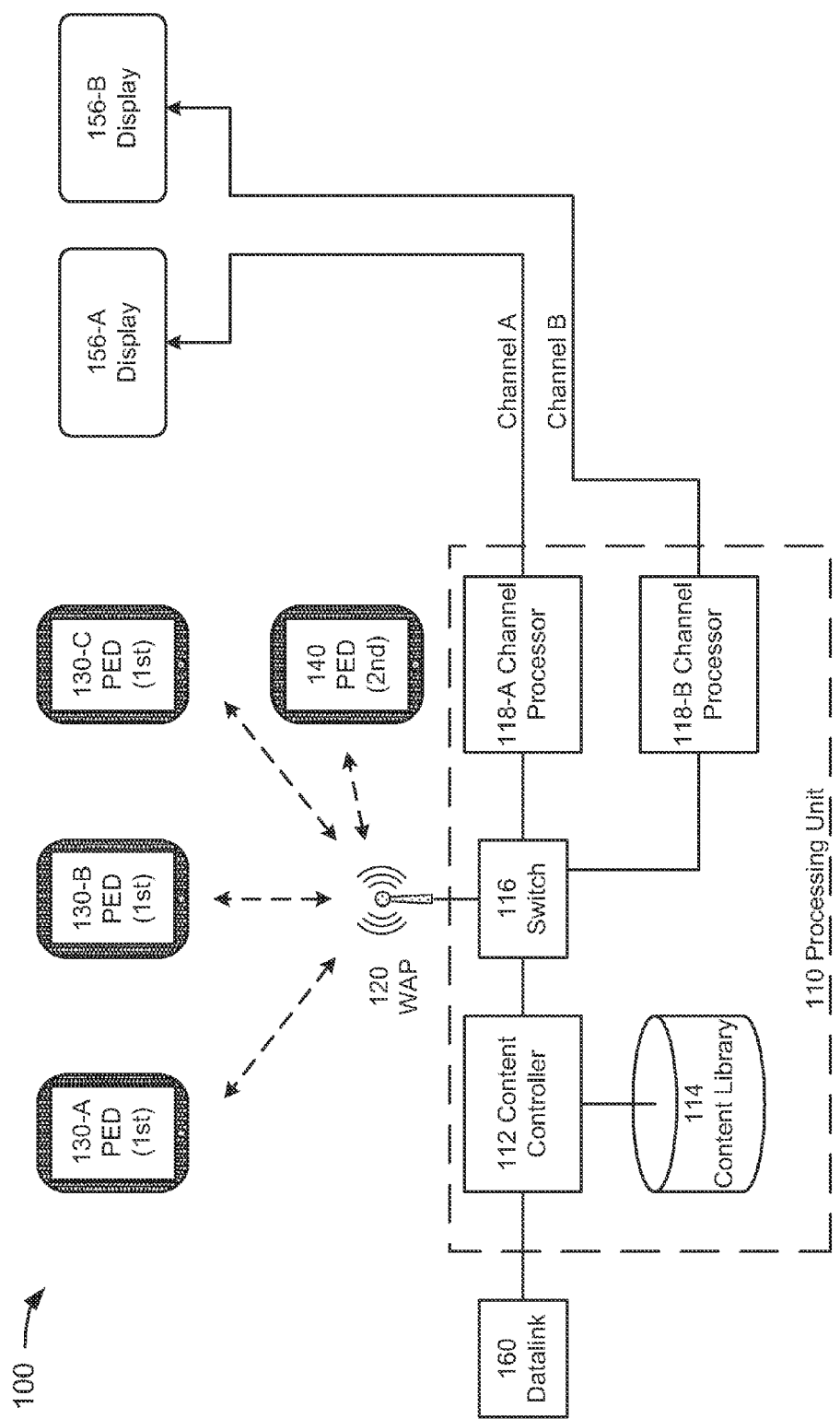
FIG. 1B depicts a block diagram of a second entertainment system or network.
Figure 1C:
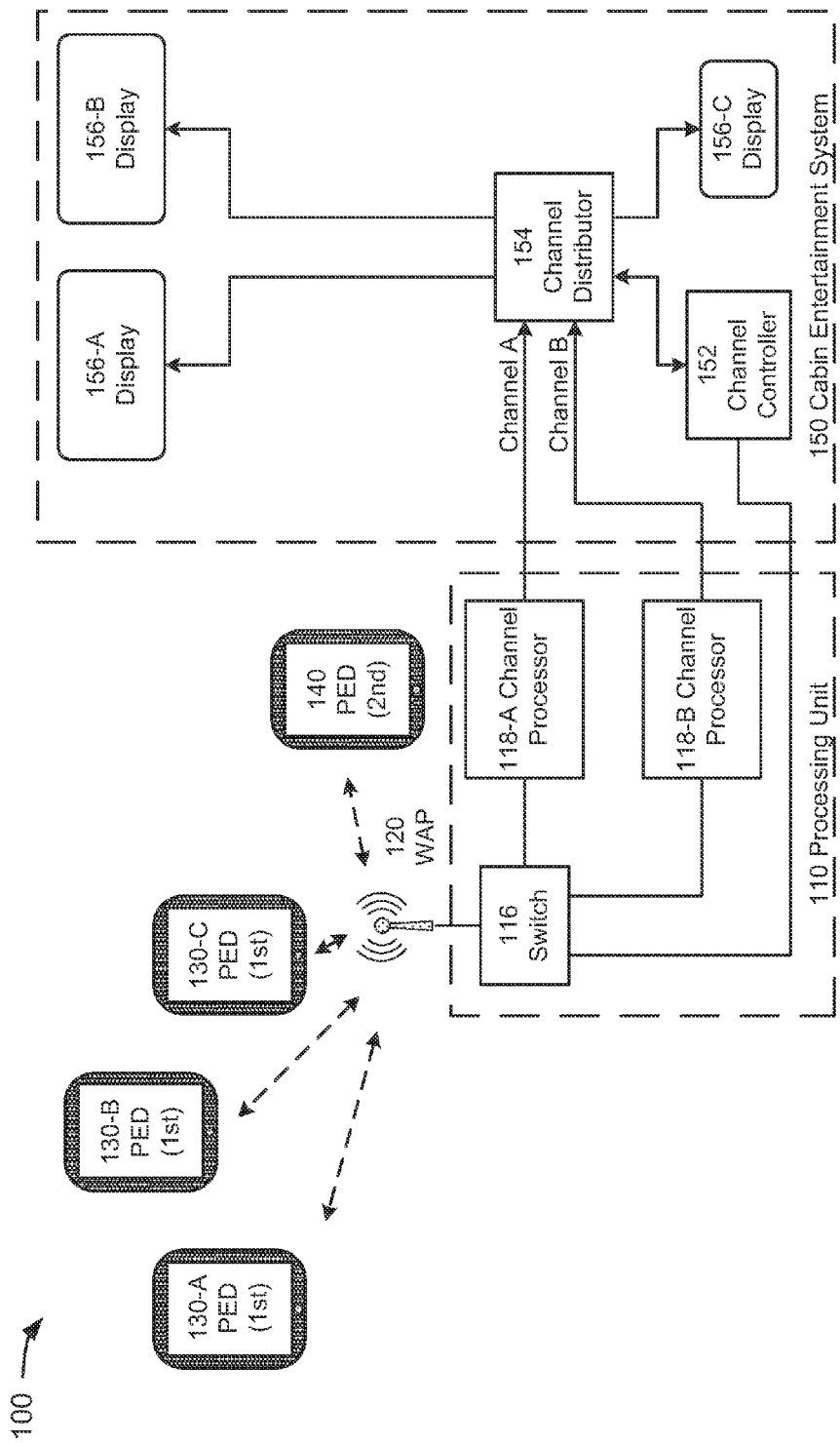
FIG. 1C depicts a block diagram of a third entertainment system or network.
Figure 1D:
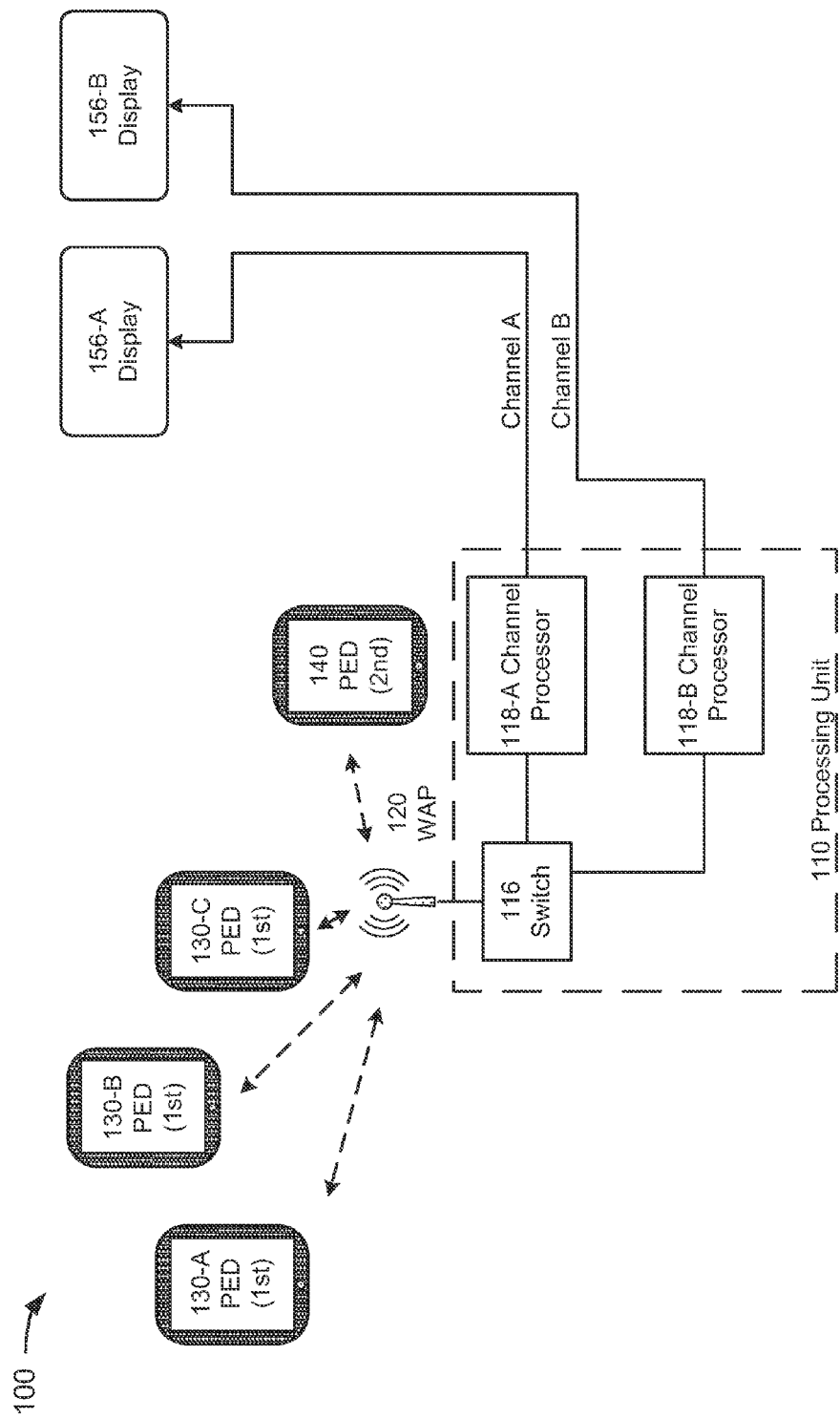
FIG. 1D depicts a block diagram of a fourth entertainment system or network.

In the embodiment of FIGS. 1A and 1B, the processing unit 110 may be comprised of a content controller 112, a content library 114, a switch 116, and a channel processor(s) 118. In the embodiments of FIGS. 1C and 1D, the processing module 110 may be comprised of the switch 116 and the channel processor(s) 118. In the embodiments of FIGS. 1A through 1D, the processing unit 110 could also include the WAP 120.

When employed, the content controller 112 may be comprised of any device configured to download, manage, and/or stream digital media content. The content controller 112 may be configured with a digital media player application used to perform these operations. For the purpose of illustration and not of limitation, one such digital media player application is iTunes developed by Apple Inc. ("Apple"). In addition, the content controller 112 may be configured with a sharing protocol designed to share digital media content over the entertainment network 100, wherein such sharing protocol could require the owner or operator to establish an authorization code and/or password as a means of limiting the sharing of digital media content. For the purpose of illustration and not of limitation, one such sharing protocol could be the Home Sharing protocol developed by Apple, a protocol included in iTunes. While the following discussion will be drawn to the content controller 112 configured with a digital media application drawn to one operating system, the content controller 112 may not be limited to a single application configuration of the operating but a plurality of applications designed and/or developed by not only Apple and its operating system but by other designers and/or developers who develop proprietary operating systems.

The digital media content may have been obtained by an owner or operator of any aircraft from a digital media store such as, but not exclusively, the iTunes Store operated by Apple. The digital media content may be subjected to a use restriction which may limit the number of displays to which the digital media content is streamed; one such restriction could be associated with digital rights management ("DRM"), an access control technology that could be employed to limit the digital content and devices after the purchase by the owner or operator. It should be noted that, although the discussion herein will be drawn to applications and/or products of Apple, the embodiments herein are not limited to these applications and/or devices but include the applications and/or the products developed by developers and manufacturers other than Apple capable employing the disclosures presented herein.

The content controller 112 (and other devices of the entertainment network 100 such as the channel processor 118 and/or the channel controller 152) (collectively, "system electronic processors") may be comprised of any electronic data processing unit or combination of electronic data processing units which execute software or computer instruction code that could be stored, permanently or temporarily, in at least one digital memory storage device or a computer-readable medium (not depicted herein) including, but not limited to, RAM, ROM, CD, DVD, hard disk drive, solid state drive ("SSD"), secure digital cards, and/or compact flash cards. The system electronic processors may be driven by the execution of software or source code containing algorithms developed for the specific functions embodied herein. Common non-exclusive examples of system electronic processors are microprocessors, Digital Signal Processors, Programmable Logic Devices, Programmable Gate Arrays, and signal generators; however, for the embodiments herein, the terms content controller, the system electronic processors are not limited to these units and its meaning is not intended to be construed narrowly.

The system electronic processors may be programmed or configured to receive as input data and/or provide output data as discussed in detail below. As embodied herein, the terms "programmed" and "configured" are synonymous with respect to the execution of software or source code developed for the specific functions and methods embodied herein. Each system electronic processor may be electronically connected, where such electronic connection may be comprised of a wired connection and/or a wireless connection which facilitate an exchange of data between the two components that communicate with other. Each electronic processor may be programmed to execute the methods embodied herein and discussed in detail below.

The content library 114 may be comprised of any medium (including an off-aircraft storage medium) configured to store digital media content purchased or obtained by the owner or operator an aircraft; although only one is shown is shown in FIG. 1, the content library may be representative of one or more libraries. The medium could be comprised of at least one database, digital memory storage device, or computer-readable digital media such as, but not limited to, those listed above. For the purpose of illustration and not of limitation, the content library 114 could be comprised of two 512 GB SSDs for storing 1.0 TB of digital media content. Once electronically connected to the content controller 112, the content library 114 could accept and store content loaded through the content controller 112 while an aircraft is on the ground or in flight, where the loading could be accomplished through the WAP 120, a wired access point (not shown in FIG. 1) such as a universal serial bus ("USB") port, and/or the datalink 160.

Although not shown in FIGS. 1A through 1D, digital media content may be stored by the owner or operator in an off-aircraft storage medium such as the iCloud operated by Apple; if so, digital media content could be retrieved by the content controller 112 from the off-aircraft storage medium through the datalink 160. Additionally, the content controller 112 and the datalink 160 could be used to facilitate a purchase of digital media content from a digital media store made by the owner or operator and/or a passenger in the aircraft.

The switch 116 may be comprised of any device used as a network switch or switching hub configured to electronically connect a plurality of devices that form a computer network, thereby facilitating the receiving, sending, and/or streaming of data (which includes data representative of digital media content) between devices. For the entertainment network 100 of FIG. 1A, the switch 116 could be configured to electronically connect the PED(s) 130 to the content controller 112 and/or PED(s) 140 to the channel processor(s) 118. For the entertainment systems 100 of FIGS. 1B and 1C, the switch 116 could be configured to electronically connect each channel the PED(s) 140 to the channel processor(s) 118. For the purposed of illustration and not of limitation, the switch 116 could be an Ethernet switch configured to perform the operations disclosed herein.

The channel processor(s) 118 may be comprised of any device configured to facilitate the streaming of digital media content to the display(s) 156; for the purpose of illustration and not of limitation, one such device could be the Apple TV digital media receiver developed by Apple. The channel processor(s) 118 may be configured with a remote control application used to facilitate the remote selection of video and/or audio content from the content library 114 and the playing of the video and/or audio of the selected content on the display unit(s) 156 of the cabin entertainment system 150; for the purpose of illustration and not of limitation, one such remote control application could be the iTunes Remote ("Remote") application and/or the Apple TV remote application, both developed by Apple. In addition, the channel processor(s) 118 may be configured with a streaming protocol which facilitates the streaming of video and/or audio content from or through the PED(s) 130 and/or PED(s) 140 to the display unit(s) 156 of the cabin entertainment system 150; for the purpose of illustration and not of limitation, one such streaming protocol could be the AirPlay protocol developed by Apple.

In the embodiments of FIGS. 1A through 1D, the WAP 120 may be comprised of any component configured to facilitate wireless communications between two components as discussed in detail below. An example of the WAP 120 could be a router configured with Wi-Fi technology, a generic term meaning any technology designed to enable a wireless exchange of data over a network. As embodied herein, the WAP 120 may be integrated within the processing unit 110.

For the entertainment network 100 of FIGS. 1A and 1B, the WAP 120 may be configured to facilitate the wireless communications between the PED(s) 130 and the content controller 112 and between the PED(s) 140 and the channel processor(s) 118. For the entertainment network 100 of FIGS. 1C and 1D, the WAP 120 may facilitate the wireless communications between the PED(s) 140 and the channel processor(s) 118 and between the channel processor(s) 118 and the content controller 112.

In the embodiments of FIGS. 1A through 1D, the PED 130 (as well as each PED 140) may be comprised of one or more mobile devices installed with and operated by a mobile operating system such as, but not limited to, a tablet device or a smartphone. Examples of a PED include the iPad, the iPhone, and the iPod, each of which are produced by Apple and each of which are configured with iOS, a mobile operating system developed and distributed by Apple. Also, the PED 130 may be comprised of one or more laptop computers on which an operating system is installed which permits an exchange of data via the WAP 120 with other PEDs and the channel processor(s) 118; an example of the laptop computer is a MacBook developed and distributed by Apple. Although the discussion herein will be drawn to one or more iOS devices, the disclosures presented herein are not dependent upon and/or limited to PEDs installed with and operated by iOS.

Each PED 130 and/or PED 140 may be configured with Wi-Fi technology to exchange data throughout the entertainment network 100. Similar to the content controller 112, each PED 130 may be configured with a protocol designed to share digital media content over the entertainment network 100; for example, iOS devices may be configured with Home Sharing that, when enabled, allows the devices to request content stored in the content library 114 and receive streaming digital media content responsive to the request. Before the user(s) of the PED(s) 130 and/or the PED(s) 140 may gain access to the content, he or she may have to enable a device's sharing function by entering the authorization code and/or password of the content controller 112.

Figure 2A:
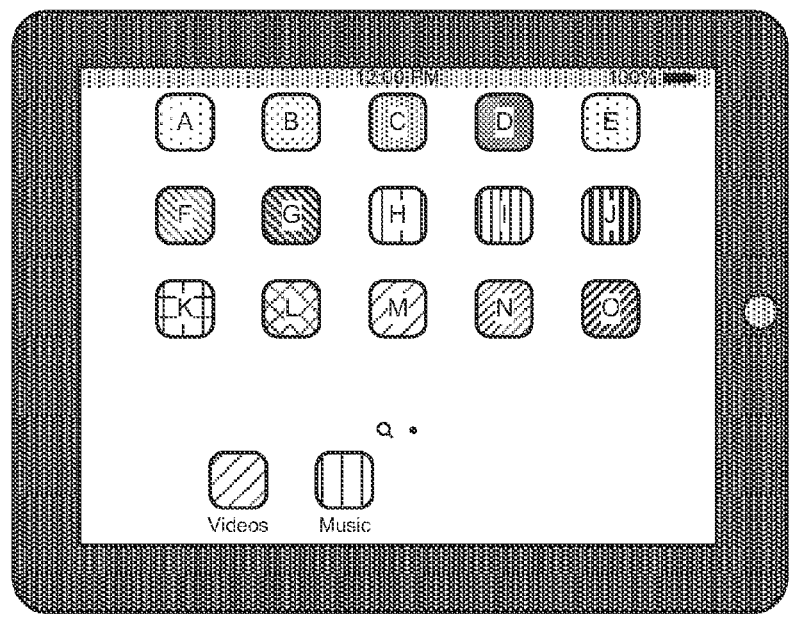
FIG. 2A depicts a portable electronic device ("PED") configured with digital media applications through which digital media content may be requested.

Each PED 130 may be configured with one or more applications, where at least one application may be a media player application used to select and play shared video and/or audio content stored in the content library 114, where such application may be accessible to the user through his or her tapping on the icon, that is, the direct manipulation of the application's icon. Referring to FIG. 2A, the user may tap on a "Video" icon or "Music" icon to run the video or music application, respectively. When presented with the application's menu comprised of directly-controlled interface control elements that known to those skilled in the art (e.g., sliders, switches, buttons, etc. . . . ), he or she may tap interface control elements until he or she makes a selection of shared video and/or audio content from the content library 114, at which time the content is streamed to and played on his or her PED 130.

The Video application could include a streaming protocol that may allow the user of the PED 130 to stream to the display(s) 156 the shared video and/or audio content streamed to the PED 130 by selecting or identifying a channel processor 118 or a channel corresponding to the channel processor 118. The streaming protocol may allow the user of the PED 130 to stream to the display(s) 156 video and/or audio content stored in his or her PED 130.

Figure 2B:
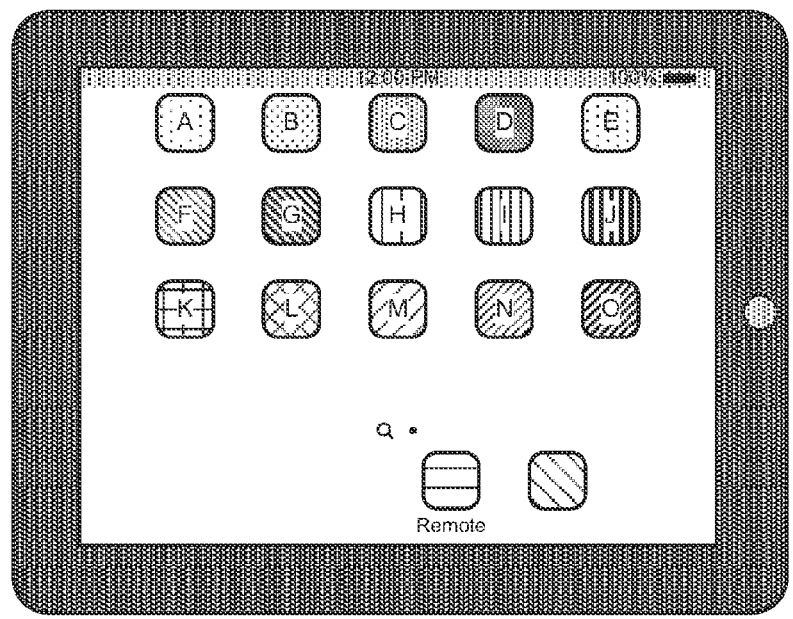
FIG. 2B depicts a PED configured with a remote control application through which digital media content may be requested for remote display.

Each PED 140 may be configured with one or more applications (including the media player application and/or the steaming protocol discussed in the preceding paragraphs), where at least one application may be a remote control application used to select shared video and/or audio content from the content library 114 and play the video and/or audio of the selected content on the display unit(s) 156. The remote control application may be accessible to the user through the direct manipulation of the application's icon. Referring to FIG. 2B, the user may tap on a "Remote" icon to run the remote control application. When presented with the application's menu comprised of directly-controlled interface control elements, he or she may tap the interface control elements selecting a channel processor 118 or the channel corresponding to the channel processor, then proceed through the menu until he or she makes a selection of shared video and/or audio content from the content library 114, at which time the content is streamed to and played on the display(s) 156 of the selected channel.

In the embodiments of FIGS. 1A and 1C, the cabin entertainment system 150 may be comprised of a channel controller 152, a channel distributor 154, and one or more displays 156. In the embodiments of FIGS. 1B and 1D, the cabin entertainment system 150 may be comprised of a channel controller 152 and one or more displays 156, a system in which channel distribution may not be controlled.

Figure 3A:
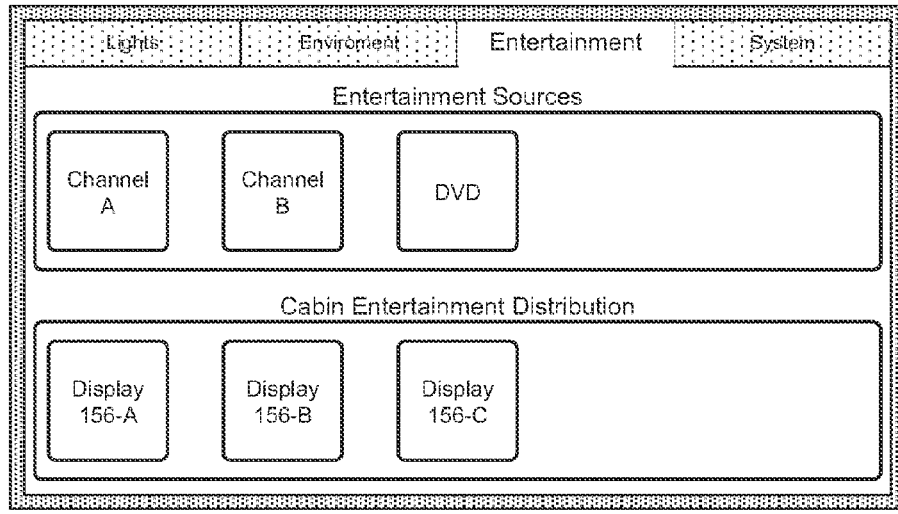
FIG. 3A depicts menus of a media source application and a channel distribution application.

In the embodiments of FIGS. 1A through 1D, the channel controller 152 may be comprised of one or more devices configured with one or more applications developed for the operating system of the cabin entertainment system 150, where at least one application may be configured to provide a menu from which a source of entertainment may be selected. Referring to FIG. 3A, a menu of the media source application labeled "Entertainment Sources" could be comprised the Channel A, Channel B, and DVD buttons. Although identified with separate items numbers 152 and 156, the channel controller 152 could be integrated into one or more of the displays 156 and configured to receive manual input via a touch screen device.

Figure 3B:
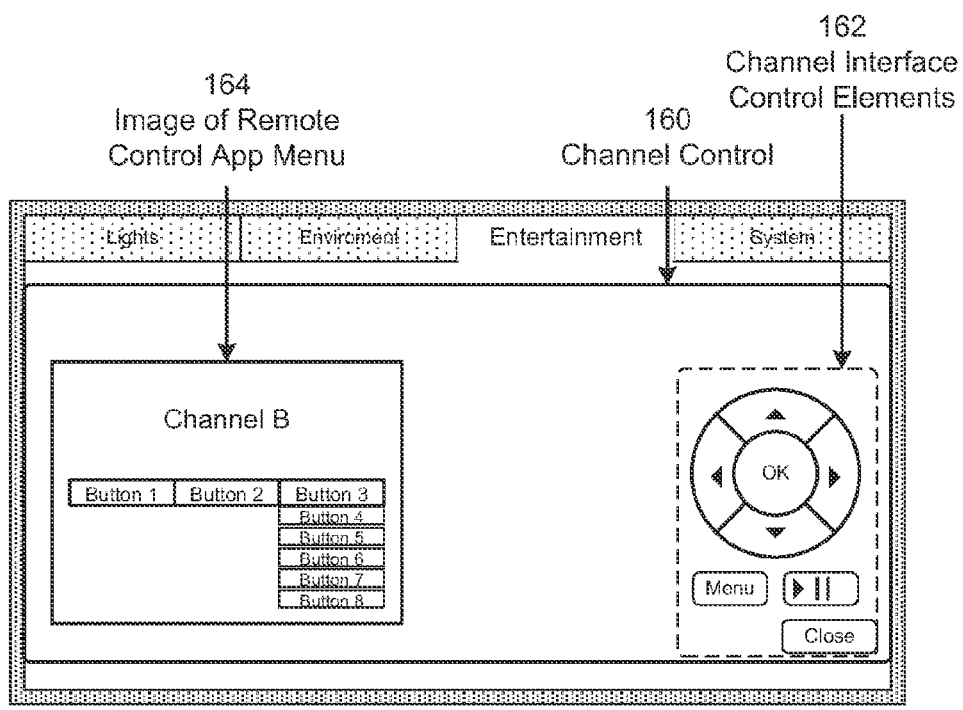
FIG. 3B depicts a channel control application.

For the purpose of illustration and not of limitation, assume the user directly manipulates the Channel B button by tapping on it. As shown in FIG. 3B, this could bring up a channel control application 160 comprised of directly-manipulated interface control elements 162 and an image of the menu 164 corresponding to the menu of the remote control application; instead of directly-manipulated interface control elements, the image of the menu 164 may display the interface control elements that are shown to the user in the menu of the remote control application but without the ability to directly manipulate them from the channel control 160. In order to proceed through the menu 164, the user may directly manipulate the buttons of the interface control elements 162. As the user selects the buttons, data representative of the user's selections may be sent to the channel processor 118-B that, as discussed above, may be configured with a remote control application. In response to each user's selection, the channel processor 118-B may send data responsive to the user's selections to the channel control 160, providing same or similar indications on the menu 164 as if he or she is directly manipulating the interface control elements corresponding to the remote control application on, for instance, the PED 140. In this manner, the user could have indirectly manipulated the interface control elements of the remote control application.

In the embodiments of FIGS. 1A and 1C, the channel distributor 154 may be comprised of any switching device responsive to the channel controller 152. Referring back to FIG. 3A, the application the cabin entertainment system 150 has been configured to provide a second menu from which channel distribution of media content streamed from one or more sources of entertainment may be selected. Labeled "Cabin Entertainment Distribution" in FIG. 3A, the menu could be comprised of directly-manipulated buttons corresponding to each display of the distribution network (shown as Display 156-A, Display 156-B, and Display 156-C). When the user taps these button(s), data representative of his or her selection(s) may be sent to the channel distributor 154 which, in turn, responds accordingly to the selection.

In the embodiments of FIGS. 1A through 1D, the display 156 may be comprised of one or more displays could be configured to receive digital media content streamed via a channel processor 118 and present the video and/or audio represented in the content.

In the embodiments of FIGS. 1A and 1B, the datalink system 160 may be comprised of any system(s) of the aircraft configured to facilitate the transmission and reception of signals between the aircraft and communications resource(s) external to the aircraft such as, but not limited to, communications ground stations and communications satellites. Electronically connected to the content controller 112, the datalink 160 may transmit signals representative of requests for digital media content to an external digital media store (e.g., iTunes Store) and/or external storage (e.g., iCloud) via the external communications resource(s); similarly, the datalink 160 may receive signals representative of streaming digital media content from the external digital media store and/or the external storage via the external communications resource(s).

Figure 4:
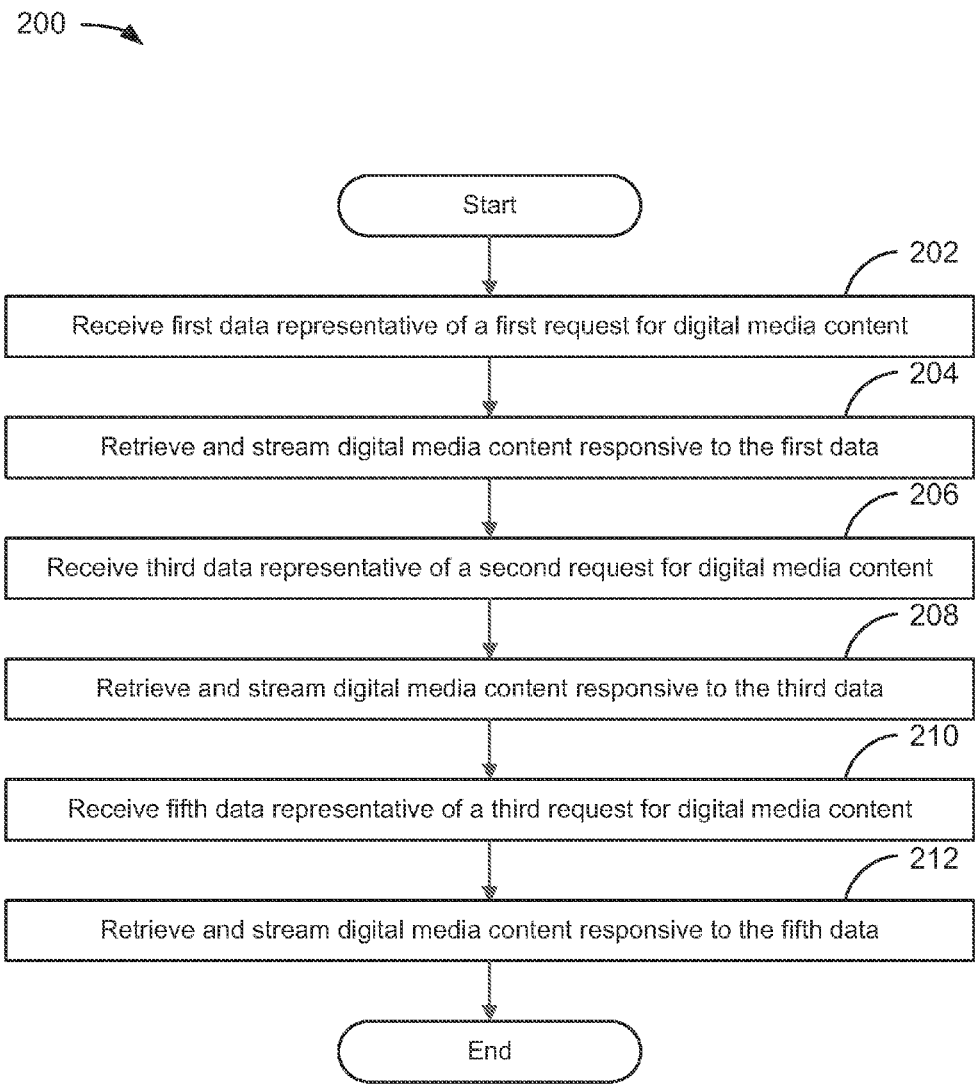
FIG. 4 depicts a flowchart of a method employed in the aircraft digital media entertainment networks of FIGS. 1A through 1D.

The advantages and benefits of the embodiments disclosed herein may be illustrated by discussing a method for controlling an aircraft digital media entertainment network. FIG. 4 depicts flowchart 200 disclosing an example of the method, where the content controller 112 may be programmed or configured with instructions corresponding to the following modules embodied in the flowchart. As necessary for the accomplishment of the following modules embodied in the flowchart, the receiving of data is synonymous and/or interchangeable with the retrieving of data, and the providing of data is synonymous and/or interchangeable with the making available or supplying of data.

Flowchart 200 begins in FIG. 4 with module 202 with the receiving of first data representative of a request for digital media content initiated by a PED configured with a media player application that, in turn, may be configured to generate and send the first data to the content controller 112. Referring to FIGS. 1A and 1B, the first data may be received via the communications interface, that is, via the WAP 120 and the switch 116; referring to FIGS. 1C and 1D, if one of the PEDs 130 is configured with the content controller 112 and the content library 114, the request may be sent to and received directly by the content controller 112 of that PED 130.

Returning to FIG. 4, the flowchart continues with module 204 with the retrieving and streaming of second data representative of digital media content responsive to the first data. The second data may be retrieved from the content library 114 (which could be comprised of an off-aircraft storage medium if connected through the datalink 160). Once retrieved, the second data may be streamed to the PED identified in the first data via the communications interface, where the route through the communications interface may be reverse route followed by the first data.

The flowchart continues with module 206 with the receiving of third data representative of a request for digital media content initiated by a PED configured with a remote control application that, in turn, may be configured to generate and send the third data to the content controller 112 via the communications interface and the channel processor 118 identified in the third data. As embodied herein, the PED of module 202 and the PED of module 206 may be the same PED. Referring to FIGS. 1A and 1B, this third data may be received via the WAP 120, the switch 116, the channel processor 118 identified in the third data, and the switch 116 again; referring to FIGS. 1C and 1D, the third data may be received via the WAP 120, the switch 116, the channel processor 118 identified in the third data, and the switch 116 and WAP 120 again.

The flowchart continues with module 208 with the retrieving and streaming of fourth data representative of digital media content responsive to the third data. The fourth data may be retrieved from the content library 114 (which could be comprised of an off-aircraft storage medium if connected through the datalink 160). Once retrieved, the fourth data may be streamed to the channel processor 118 identified in the third data via the communications interface, where the route through the communications interface may be reverse route followed by the third data.

The flowchart continues with module 210 with the receiving of fifth data representative of a request for digital media content received from the channel or channel processor 118 selected by the user, where the channel control application 160 of the channel controller 152 has been used to indirectly manipulate the interface control elements of the remote control application of the channel processor 118. Referring to FIG. 1A, the fifth data may be received via the switch 116; referring to FIG. 1C, the fifth data may be received via the switch 116 and the WAP 120.

The flowchart continues with module 212 with the retrieving and streaming of sixth data representative of digital media content responsive to the fifth data. The sixth data may be retrieved from the content library 114 (which could be comprised of an off-aircraft storage medium if connected through the datalink 160). Once retrieved, the sixth data may be streamed to one or more user devices (e.g., one or more displays 156) via the communications interface and the channel processor 118 identified in the fifth data, where the route through the communications interface may be reverse route followed by the sixth data. In the embodiments of FIGS. 1A and 1C, the route through which the sixth data is streamed may include the channel distributor 154. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An aircraft digital media entertainment network system inclusive of at least one hardware processor, such system comprising:
   at least one first portable electronic device ("PED") configured with
      a sharing protocol, and
      a media player application configured to
         receive first input data via a user's direct manipulation of at least one interface control element employed by the media player application,
         generate first data responsive to the first input data,
         send the first data to a content controller, and
         receive second data streamed from the content controller;
   at least one second PED configured with
      the sharing protocol, and
      a remote control application configured to
         receive second input data via a user's direct manipulation of at least one interface control element employed by the remote control application,
         generate third data responsive to the second input data, and
         send the third data to one channel processor identified in the third data;
   at least one cabin channel controller configured with
      a cabin channel control application configured to
         receive third input data via a user's direct manipulation of at least one interface control element employed by the cabin channel control application, and
         send the third input data to one channel controller identified in the third input data;
   at least one channel processor configured to
      receive the third data from each second PED,
      send the third data to the content controller,
      receive fourth data,
      stream the fourth data to at least one user device of its channel,
      receive fifth data representative of a user's indirect manipulation of at least one interface control element employed by the remote control application, where the fifth data corresponds to the third input data,
      send the fifth data to the content controller,
      receive sixth data, and
      stream the sixth data to at least one user device of its channel;
   the communications interface comprised of at least a switch and configured to facilitate exchanges of data between
      each second PED and the content controller,
      the content controller and at least one channel processor, and
      each channel controller and at least one channel processor;
   a content library configured to store digital media content subjected to an end user license agreement; and
   the content controller configured with the sharing protocol and configured to
      receive the first data,
      retrieve the second data responsive to the first data from the content library, where
         the second data is representative of first digital media content,
      stream the second data to the first PED identified in the first data,
      receive the third data,
      retrieve the fourth data responsive to the third data from the content library, where
         the fourth data is representative of second digital media content,
      stream the fourth data to the channel processor identified in the third data,
      receive the fifth data,
      retrieve the sixth data responsive to the fifth data from the content library, where
         the sixth data is representative of third digital media content,
      stream the sixth data to the channel processor identified in the fifth data.

2. The system of claim 1, wherein
   the operating systems of each first PED, each second PED, and each channel processor are comprised of a first operating system, and
   the operating system of each channel controller is comprised of a second operating system.

3. The system of claim 1, wherein at least one first PED and at least one second PED are the same PED.

4. The system of claim 1, wherein
   each channel processor is further configured with a streaming protocol, such that
      at least one first PED is further configured with the streaming protocol configured to
         stream the second data to one channel processor identified in the streaming protocol, or
         stream data representative of content stored in the first PED.

5. The system of claim 1, wherein the communications interface is further comprised of a wireless access point.

6. The system of claim 5, wherein the communications interface is further configured to facilitate exchanges of data between each first PED and the content controller.

7. The system of claim 1, wherein each channel processor and the switch comprise a processing unit.

8. The system of claim 7, wherein the processing unit is further comprised of a wireless access point.

9. The system of claim 1, wherein each channel processor, the content controller, the content library, and the switch comprise a processing unit.

10. The system of claim 9, wherein the processing unit is further comprised of a wireless access point.

11. The system of claim 1, further comprising:
    a datalink, such that
       the content library is comprised of an off-aircraft storage medium accessible through the datalink, or
       the content library is further comprised of an off-aircraft storage medium accessible through the datalink.

12. The system of claim 1, wherein at least one user device is a display.

* * * * *